US011499667B2

(12) United States Patent
Yen et al.

(10) Patent No.: US 11,499,667 B2
(45) Date of Patent: Nov. 15, 2022

(54) ELEVATABLE SUPPORTING DEVICE

(71) Applicant: SYNCMOLD ENTERPRISE CORP., New Taipei (TW)

(72) Inventors: Ching-Hui Yen, New Taipei (TW); Chien-Cheng Yeh, New Taipei (TW); Chun-Hao Huang, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 13 days.

(21) Appl. No.: 17/313,574

(22) Filed: May 6, 2021

(65) Prior Publication Data

US 2021/0254782 A1 Aug. 19, 2021

Related U.S. Application Data

(62) Division of application No. 16/669,194, filed on Oct. 30, 2019, now Pat. No. 11,112,056.

(60) Provisional application No. 62/752,818, filed on Oct. 30, 2018.

(51) Int. Cl.
| | |
|---|---|
| *F16M 13/00* | (2006.01) |
| *F16M 11/18* | (2006.01) |
| *F16M 11/10* | (2006.01) |
| *F16M 11/26* | (2006.01) |
| *F16M 13/02* | (2006.01) |
| *F16M 11/20* | (2006.01) |

(52) U.S. Cl.
CPC ............ *F16M 11/18* (2013.01); *F16M 11/10* (2013.01); *F16M 11/2014* (2013.01); *F16M 11/26* (2013.01); *F16M 13/022* (2013.01); *F16M 2200/022* (2013.01)

(58) Field of Classification Search
CPC .... F16M 11/18; F16M 11/10; F16M 11/2014; F16M 11/26; F16M 13/022
See application file for complete search history.

(56) References Cited

U.S. PATENT DOCUMENTS

| | | | |
|---|---|---|---|
| 6,997,422 B2 * | 2/2006 | Sweere | F16M 11/2092 248/123.11 |
| 7,506,853 B2 | 3/2009 | Sweere et al. | |
| 8,152,144 B2 | 4/2012 | Wisse | |
| 8,313,074 B2 | 11/2012 | Wang | |
| 9,167,707 B1 * | 10/2015 | Wang | F16M 11/28 |
| 10,018,225 B1 * | 7/2018 | Yen | F16C 33/1095 |

(Continued)

*Primary Examiner* — Amy J. Sterling
(74) *Attorney, Agent, or Firm* — Muncy, Geissler, Olds & Lowe, P.C.

(57) ABSTRACT

An elevatable supporting device for bearing a display is provided. The elevatable supporting device comprises an upright, an energy storage element, and a bearing module. The upright includes a first surface and a second surface which is non-parallel to the first surface. The energy storage element abuts against the first surface and the second surface and includes a first arm providing a first resistance and a second arm providing a second resistance. A first included angle is defined between the first arm and the second arm. When the energy storage element moves from the highest position to the lowest position, the first included angle decreases so that one of the first resistance and the second resistance may increase in order to maintain a total effective resistance along the first axis. Accordingly, the display may be able to stop at any position between the highest position and the lowest position.

14 Claims, 13 Drawing Sheets

(56) References Cited

U.S. PATENT DOCUMENTS

| | | | |
|---|---|---|---|
| 10,066,780 B2 * | 9/2018 | Hsu | F16M 11/10 |
| 11,112,056 B2 * | 9/2021 | Yen | F16M 11/10 |
| 2005/0145762 A1 | 7/2005 | Sweere et al. | |

* cited by examiner

ELEVATABLE SUPPORTING DEVICE

CROSS REFERENCE TO RELATED APPLICATION

This application is a Divisional of co-pending application Ser. No. 16/669,194 filed on Oct. 30, 2019; and this application claims the benefit of U.S. Provisional Application Ser. No. 62/752,818 filed on Oct. 30, 2018; the entire contents of all of which are hereby incorporated by reference.

BACKGROUND OF THE INVENTION

1. Field of the Invention

The present invention relates to a supporting device, more particularly, to an elevatable supporting device for bearing a display.

2. Description of Related Art

U.S. Pat. No. 7,506,853 disclosed a supporting device for bearing a display, which includes a carrier, a sliding module, an upright, a base, and an energy storage element. The base is disposed on a working surface, the upright is disposed on the base and has a cam, the sliding module is disposed on the upright, and the carrier is disposed to connect to a display. The display and the carrier can move upward and downward with respect to the upright through the sliding module. When the display moves up and down, the energy storage element is actuated to slide along the curved surface of the cam and generates different supporting forces due to elastic changes in different positions to support the display. Specifically, when the energy storage element moves along the curved surface of the cam, the force generated between the energy storage element and the cam may change, and the force can be transfer to support the display by the cam. Accordingly, a single supporting device may be applied to displays with different sizes and weights. The storage element does not need to be adjusted or replaced when bearing displays with different sizes.

However, the conventional supporting device has the disadvantages of higher accuracy requirements of the curved surface of the cam and shorter lifetime of the energy storage element. Therefore, the present invention provides a novel supporting device having an energy storage element with two arms sliding up and down respectively against two non-parallel surfaces to stabilize the supporting force for supporting the display.

SUMMARY OF THE INVENTION

The main object of the present invention is to provide an elevatable supporting device, wherein the elevatable supporting device utilizes an energy storage element having two arms that slide upwardly and downwardly between two non-parallel inclined surfaces to stabilize the supporting force for supporting the display, so that the display is capable of stopping at any position according to a user's adjustment.

The elevatable supporting device is advantageous of fewer components, simple operation principle, stable supporting force, and long-life energy storage element.

For achieving the aforementioned object, the present invention provides an elevatable supporting device for bearing a display. The elevatable supporting device comprises an upright, an energy storage element, and a bearing module.

The upright extends along a first axis and has an accommodating space, a first surface, and a second surface which is non-parallel to the first surface, wherein the accommodating space is formed between the first surface and the second surface, and a highest position and a lowest position are defined on the first axis. The energy storage element is movably disposed in the accommodating space and abuts against the first surface and the second surface, wherein the energy storage element has a connecting section, a first arm extending from the connecting section to provide a first resistance, and a second arm extending from the connecting section to provide a second resistance. The bearing module connects to the display and the energy storage element and slides along the first axis with respect to the upright. Wherein a first included angle is defined between the first arm and the second arm; a second included angle is defined between the first arm and the first surface; a third included angle, which is constant and smaller than the first included angle, is defined between the first surface and the first axis; a fourth included angle is defined between the second arm and the second surface; and a fifth included angle, which is constant and smaller than the first included angle, is defined between the second surface and the first axis. When the energy storage element moves from the highest position to the lowest position, the first included angle between the first arm and the second arm of the energy storage element continuously decreases so that at least one of the first resistance and the second resistance continuously increases and at least one of the second included angle and the fourth included angle continuously decreases. On the contrary, when the energy storage element moves from the lowest position to the highest position, the first included angle between the first arm and the second arm of the energy storage element continuously increases so that at least one of the first resistance and the second resistance continuously decreases and at least one of the second included angle and the fourth included angle continuously increases. Accordingly, a total effective resistance on the first axis is substantially constant, and when an external force is applied, the energy storage element, the bearing module, and the display move simultaneously. When the external force is removed, the energy storage element, the bearing module, and the display remain in a static equilibrium status so that the display can stop at any position between the highest position and the lowest position.

An interval on a second axis perpendicular to the first axis is defined between the first surface and the second surface, wherein a width of the interval continuously decreases from the highest position to the lowest position.

A projected length of the first arm projected on the first axis continuously increases from the highest position to the lowest position.

The first resistance forms a first effective resistance on the first axis and the second resistance forms a second effective resistance on the first axis, wherein the total effective resistance is a sum of the first effective resistance and the second effective resistance.

In one embodiment of the present invention, the energy storage element further has a first follower disposed on the first arm and a second follower disposed on the second arm, wherein the first follower and the second follower contact with the first surface and the second surface respectively.

In one embodiment of the present invention, the upright has a sliding module disposed along the first axis, and the bearing module connects to the sliding module to slide with respect to the upright so that the first arm slides along the first surface and the second arm slides the second surface. The bearing module connects to the connecting section.

In a preferred embodiment, the first surface and the second surface are symmetrical with each other with respect to the first axis.

In another embodiment of the present invention, the first surface and the second surface are non-symmetrical with each other with respect to the first axis in which the second surface is parallel to the first axis.

In one embodiment of the present invention, the first arm, the second arm, and the connecting section integrally form a torsion spring, wherein the connecting section has a winding portion, and the bearing module has a shaft passing through the winding portion.

In another embodiment of the present invention, the energy storage element is a V-shaped elastic steel plate which is integrally formed, wherein the bearing module has two shafts disposed on opposite sides of the connecting section to clamp the connecting section.

As another alternative, the bearing module has at least one shaft and a block, and wherein the at least one shaft and the connecting section are secured to the block. The bearing module further has a thread and a nut for securing the connecting section to the block, wherein the shaft passes through and is secured to the block.

In yet another embodiment of the present invention, the connecting section is a supporting block connecting to the bearing module, wherein the supporting block has a first inclined plane for the first arm partially attaching thereto and a second inclined plane for the second arm partially attaching thereto. The first arm and the second arm are flat springs respectively.

In a preferred embodiment of the present invention, the bearing module further comprises a friction unit disposed adjacent to the upright for providing a normal force towards the upright, and a kinetic friction force is generated between the friction unit and the upright when the bearing module moves with respect to the upright. The friction unit has a friction element and a screw abutting against the friction element towards the upright so that the normal force can be adjusted according to an extent of the screw abutting against the friction element.

DETAILED DESCRIPTION OF THE PREFERRED EMBODIMENT

Figure 1:
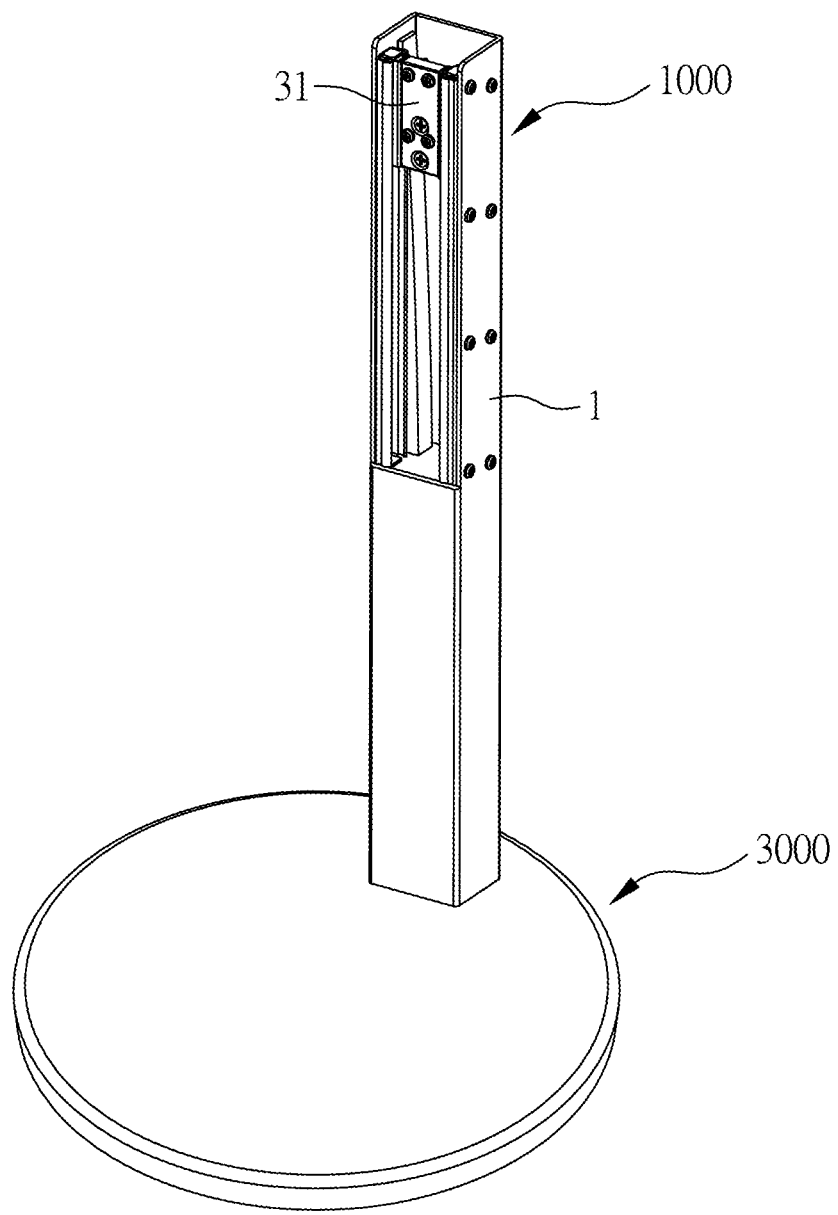
FIG. 1 is a partial perspective view of the elevatable supporting device of the first embodiment of the present invention connecting a base.
Figure 2:
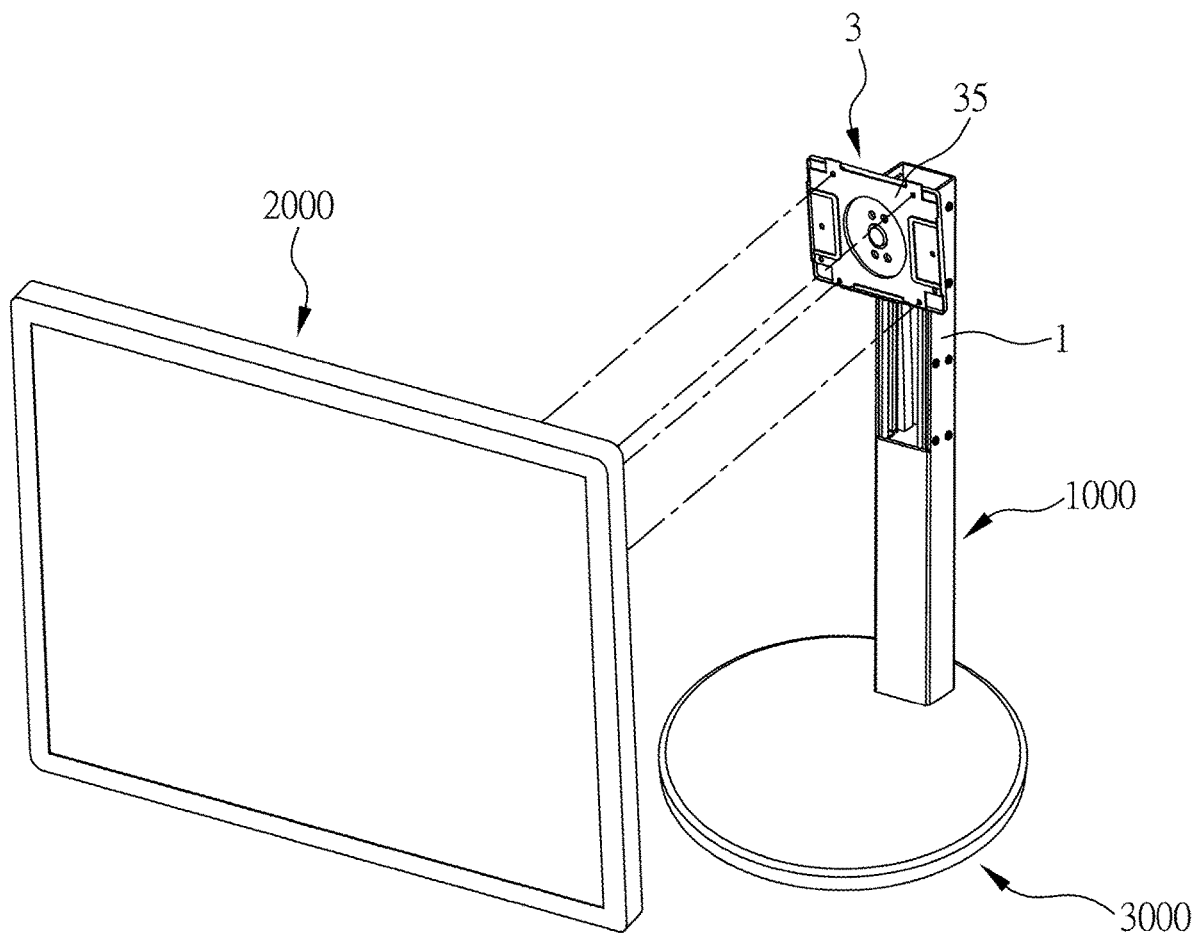
FIG. 2 is a perspective view of the elevatable supporting device of the first embodiment of the present invention connecting a base, a carrier, and a display.

Please refer to FIG. 1 and FIG. 2, which illustrated a perspective view of the elevatable supporting device 1000 connecting a base 3000, and a perspective view of the elevatable supporting device 1000 connecting a base 3000 and a display 2000. The elevatable supporting device 1000 is utilized for bearing the display 2000; however, the elevatable supporting device 1000 does not have to be connected to a base 3000. In other embodiments, the elevatable supporting device 1000 can be disposed onto a surface of a wall, on a desktop, or be connected to other devices, which is not particularly limited.

Figure 3:
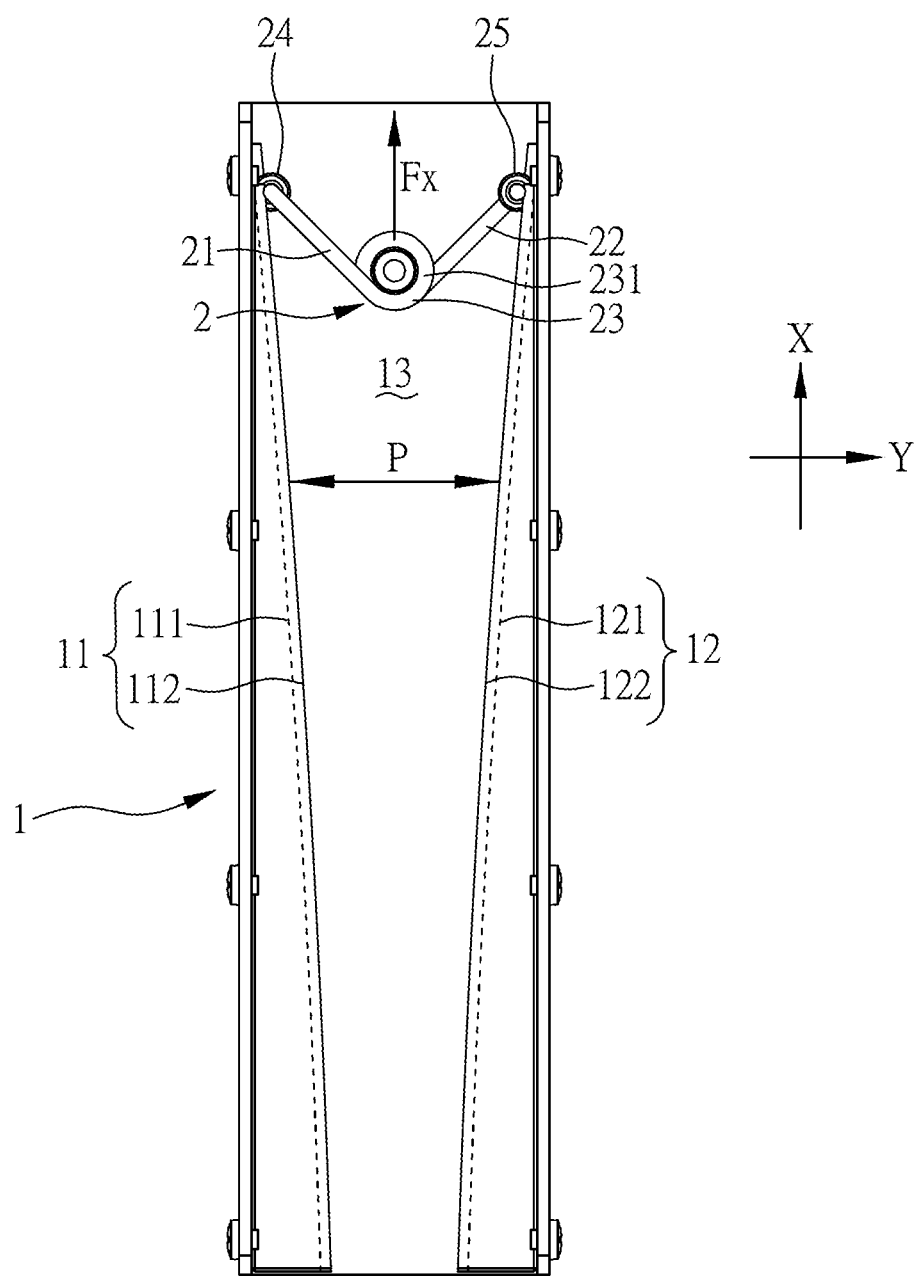
FIG. 3 is a partial view of the elevatable supporting device of the first embodiment of the present invention.
Figure 4:
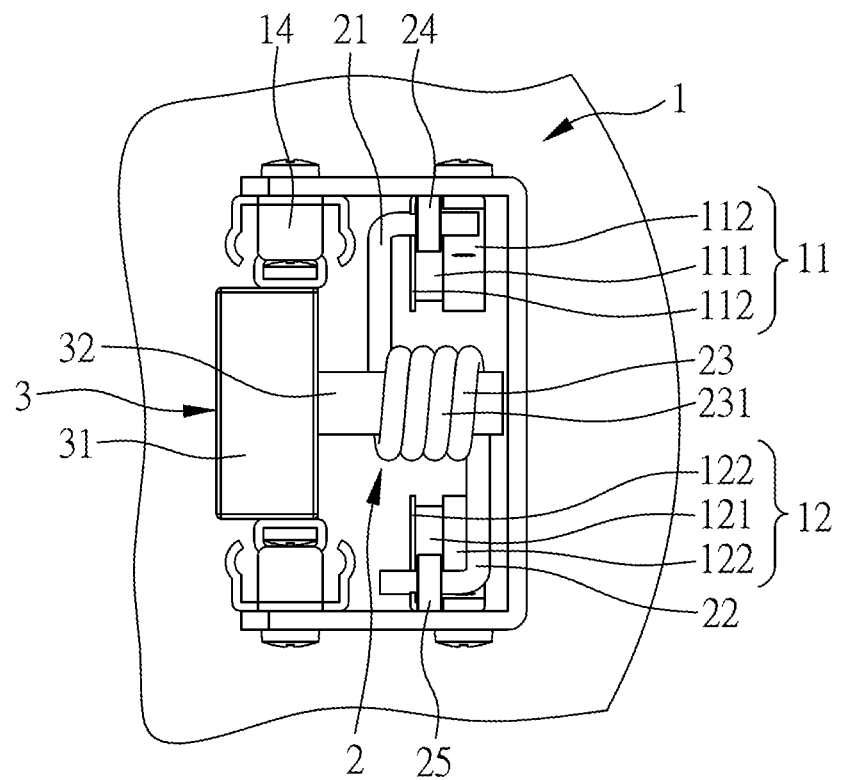
FIG. 4 is a top view of the elevatable supporting device of the first embodiment of the present invention.

Please refer to FIG. 3 and FIG. 4, which illustrate a partial view and a top view of the elevatable supporting device 1000 of the first embodiment of the present invention. The elevatable supporting device 1000 comprises an upright 1, an energy storage element 2, and a bearing module 3. The upright 1 extends along a first axis X and including a first surface 11, a second surface 12 being non-parallel to the first surface 11, and an accommodating space 13 formed between the first surface 11 and the second surface 12. In the present embodiment, the upright 1 further includes a sliding module 14 disposed along the first axis X and being adjacent to the first surface 11 and the second surface 12. As illustrated in FIG. 4, the sliding module 14 includes two slide rails; therefore, the bearing module 3 can be slidably connected to the slide rails and slides back and forth along the first axis X with respect to the upright 1.

Furthermore, the energy storage element 2 is disposed in the accommodating space 13. The bearing module 3 is connected between the display 2000 and the energy storage element 2 and is actuated together therewith. The bearing module 3 includes a slider 31, a shaft 32, and a board 35 (refer to FIG. 2). The slider 31 connects to the sliding module 14, the shaft 32 is fixed to the slider 31 and passes through the energy storage element 2. The board 35 is connected between the display 2000 and the slider 31. Accordingly, the energy storage element 2 may slide along the first surface 11 and the second surface 12 while the bearing module 3 slides with respect to the upright 1 by the sliding module 14.

To specify the elevatable supporting device 1000 of the present invention, a highest position and a lowest position are defined on the first axis X, wherein the energy storage element 2 illustrated in FIG. 3 is located at the highest position. Also, an interval P on a second axis Y perpendicular to the first axis X is defined between the first surface 11 and the second surface 12, wherein a width of the interval P continuously decreases from the highest position to the lowest position.

One of the core technical features of the elevatable supporting device 1000 of the present invention is that the energy storage element 2 coordinates with the first surface 11 and the second surface 12 and provides sustainable and stable bearing capacity along the first axis X. The following paragraph will describe the details of the energy storage element 2.

The energy storage element 2 is movably disposed in the accommodating space 13 and abuts against the first surface 11 and the second surface 12 to provide a resistance in a direction opposite to the gravity. Further, the energy storage element 2 includes a first arm 21, a second arm 22, a connecting section 23, a first follower 24, and a second follower 25, wherein the first arm 21 and the second arm 22 extend from the connecting section 23, the first follower 24 is disposed on the first arm 21, and the second follower 25 is disposed on the second arm 22. The first arm 21 provides a first resistance F1, and the second arm 22 provides a second resistance F2. In the present embodiment, the first arm 21, the second arm 22, and the connecting section 23 integrally form a torsional spring; therefore, the connecting section 23 has a winding portion 231 for the shaft 32 to pass therethrough. The first follower 24 and the second follower 25 may be bearings which are pivotally fixed to the first arm 21 and the second arm 22 respectively; therefore, the first follower 24 and the second follower 25 may scroll respectively on the first surface 11 and the second surface 12. However, the present invention is not limited thereto.

It should be noted that the first surface 11 has a concave portion 111 and two convex portions 112, and the second surface 12 has a concave portion 121 and two convex portions 122 (please refer to FIG. 3 and FIG. 4), wherein the concave portions 111, 121 are respectively located between the convex portions 112 and the convex portions 122. Through this design, the locations of the first follower 24 and the second follower 25 may be restricted without departing the concave portions 111, 121 when the first follower 24 slides along the concave portion 111 of the first surface 11 and the second follower 25 slides along the concave portion 121 of the second surface 12. Hence, the first follower 24 and the second follower 25 will not shift and causing uneven force when the energy storage element 2 moves back and forth along the first axis X.

Figure 5:
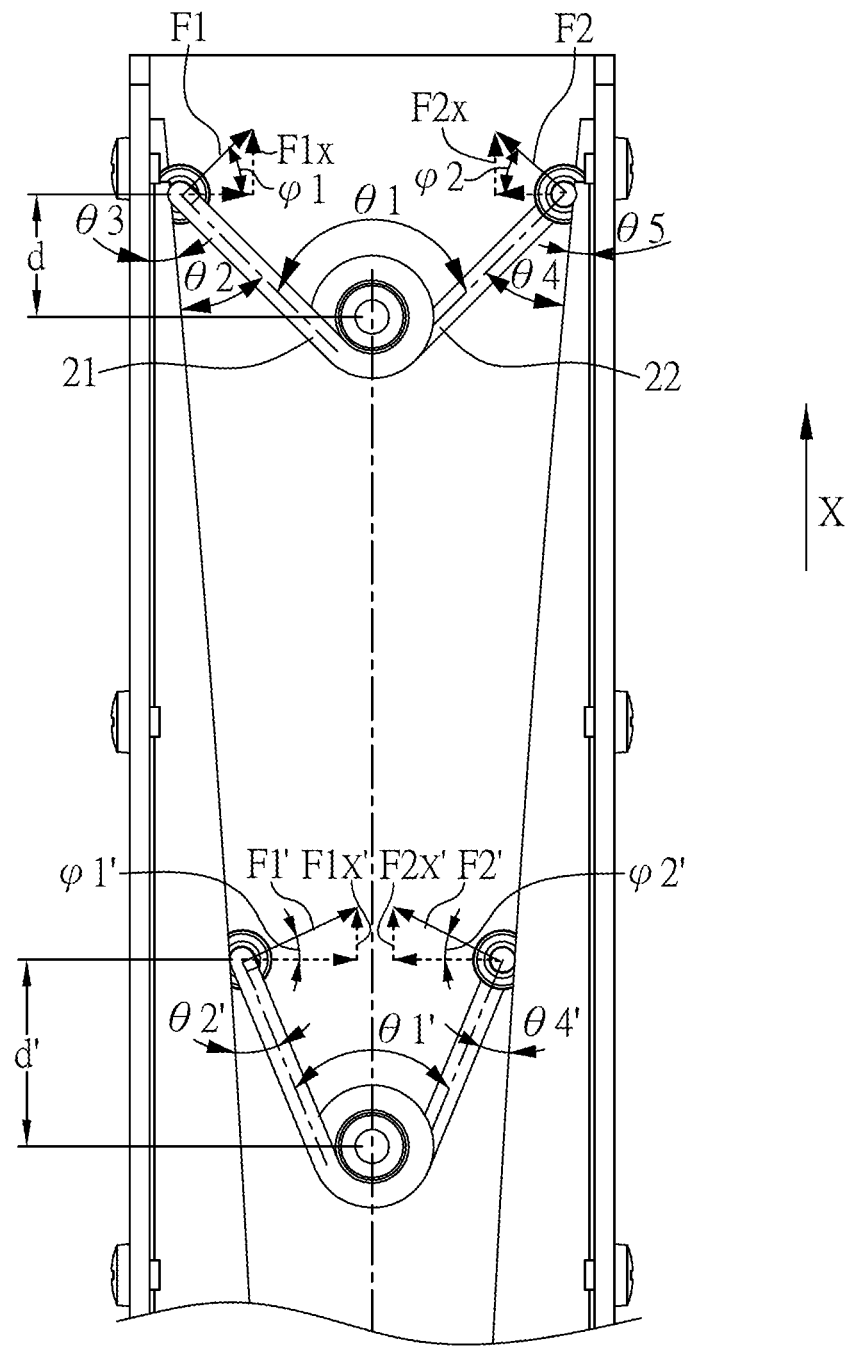
FIG. 5 is an operational principle schematic view of the elevatable supporting device of the first embodiment of the present invention.

Please refer to FIG. 5 for a concise description of the operational principle of the energy storage element 2. A first included angle $\theta 1$ is defined between the first arm 21 and the second arm 22; a second included angle $\theta 2$ is defined between the first arm 21 and the first surface 11; a third included angle $\theta 3$ is defined between the first surface 11 and the first axis X; a fourth included angle $\theta 4$ is defined between the second arm 22 and the second surface 12; and a fifth included angle $\theta 5$ is defined between the second surface 12 and the first axis X. The third included angle $\theta 3$ is a constant because the first surface 11 is an inclined surface with respect to the first axis X, that is, the third included angle $\theta 3$ remains constant at any location of the first surface 11. Identically, the fifth included angle $\theta 5$ is a constant. Further, in the present embodiment, the first surface 11 and the second surface 12 are symmetrical with each other with respect to the first axis X; therefore, the third included angle $\theta 3$ equals the fifth included angle $\theta 5$.

The energy storage element 2 is compressed and the first included angle $\theta 1$ between the first arm 21 and the second arm 22 continuously decreases when the energy storage element 2 moves from the highest position to the lowest position (please refer to FIG. 5), so that the first resistance F1 and the second resistance F2 will continuously increase. Also, the ends of the first arm 21 and the second arm 22 connected to the connecting section 23 will become closer to the first surface 11 and the second surface 12 respectively so that the second included angle $\theta 2$ and the fourth included angle $\theta 4$ will continuously decrease. Due to the change of the first included angle $\theta 1$, the second included angle $\theta 2$, and the fourth included angle $\theta 4$, a first effective resistance F1$x$ on the first axis X formed by the first resistance F1 and a second effective resistance F2$x$ on the first axis X formed by the second resistance F2 are essentially stabilized.

On the contrary, when the energy storage element 2 moves from the lowest position to the highest position (please refer to FIG. 5), the first included angle $\theta 1$ between the first arm 21 and the second arm 22 continuously increases so that the first resistance F1 and the second resistance F2 continuously decrease. Also, the second included angle $\theta 2$ and the fourth included angle $\theta 4$ continuously increase. Due to the change of the first included angle $\theta 1$, the second included angle $\theta 2$, and the fourth included angle $\theta 4$ during the process of reverse movement, the first effective resistance F1$x$ on the first axis X formed by the first resistance F1 and the second effective resistance F2$x$ on the first axis X formed by the second resistance F2 are essentially stabilized.

Accordingly, in the case of applying an external force, the energy storage element 2, the bearing module 3, and the display 2000 are actuated together so that the display 2000 may be adjusted to an appropriate position by the user. When the external force is removed, the energy storage element 2, the bearing module 3, and the display 2000 remain in a static equilibrium status so that the display 2000 may stop at any position between the highest position and the lowest position.

The variations of the first effective resistance F1$x$ on the first axis X and the second effective resistance F2$x$ on the first axis X when the energy storage element 2 moves from different positions will be described in detail in the following paragraph. As illustrated in FIG. 5, the first resistance F1 constantly faces the direction perpendicular to the first arm 21. The first included angle $\theta 1$ continuously decreases, the elastic storage energy of the energy storage element 2 gradually increases, the first resistance F1 increases, and the direction of the first resistance F1 continuously changes as the energy storage element 2 moves from the highest position to the lowest position. In order to obtain the first effective resistance F1$x$, a first inclined angle $\varphi 1$ between the first resistance F1 and the second axis Y should first be defined. It should be known by calculation that the first inclined angle $\varphi 1$ is the sum of the second included angle $\theta 2$ and the third included angle $\theta 3$ essentially. Because the third included angle $\theta 3$ is a constant, therefore, the first inclined angle $\varphi 1$ increases as the second included angle $\theta 2$ increases and decreases as the second included angle $\theta 2$ decreases between the highest position and the lowest position. Similarly, the second resistance F2 constantly faces the direction perpendicular to the second arm 2. The first included angle θ1 continuously decreases, the elastic storage energy of the energy storage element 2 gradually increases, the second resistance F2 increases, and the direction of the second resistance continuously changes as the energy storage element 2 moves from the highest position to the lowest position. In order to obtain the second effective resistance F2x, a second inclined angle φ2 between the second resistance F2 and the second axis Y should first be defined. It should be known by calculation that the second inclined angle φ2 is the sum of the fourth included angle θ4 and the fifth included angle θ5 essentially, and the second inclined angle φ2 increases as the fourth included angle θ4 increases and decreases as the fourth included angle θ4 decreases between the highest position and the lowest position.

The main source of the supporting force against the weight of the display 2000 and the bearing module 3 is the sum of the dividing forces along the first axis X of first resistance F1 and the second resistance F2 provided by the energy storage element 2, that is, the sum of the first effective resistance F1x (F1·sin φ1) and the second effective resistance F2x (F2·sin φ2). The sum is defined as a total effective resistance Fx. As illustrated in FIG. 5, when the energy storage element 2 moves from the highest position to the lowest position, the first included angle θ1 becomes a smaller first includes angle θ1', the second included angle θ2 becomes a smaller second included angle θ2', the fourth included angle θ4 becomes a smaller fourth included angle θ4', the first inclined angle φ1 becomes a smaller inclined angle φ1 ', the second inclined angle φ2 becomes a smaller inclined angle φ2', and the first resistance F1 becomes a larger first resistance F1', and the second resistance F2 becomes a larger second resistance F2'. Because the value of the first inclined angle φ1 decreases to φ1', the value of the sin φ1 decreases to sin φ1' when the energy storage element 2 moves from the highest position to the lowest position, which shows that the dividing force of the first resistance F1 on the first axis X gradually decreases. However, the value of the first resistance F1 increases to F1' when the energy storage element 2 moves from the highest position to the lowest position so that the first effective resistance F1x (F1·sin φ1) at the highest position substantially equals to the first effective resistance F1x' (F1'·sin φ1') at the lowest position. Similarly, the second effective resistance F2x (F2·sin φ2) at the highest position substantially equals to the second effective resistance F2x' (F2'·sin φ2') at the lowest position. Hence, it can be inferred that the total effective resistance Fx at the highest position and a total effective resistance Fx' at the lowest position is essentially the same. According to the above descriptions, although the first resistance F1 and the second resistance F2 were different from the first resistance F1' and the second resistance F2' (the first resistance F1' is larger than the first resistance F1, the second resistance F2' is larger than the second resistance F2) at the highest position and the lowest position, the energy storage element 2 may essentially provide a constant force along the first axis X. In addition, the display 2000 and the bearing module 3 may stop at any position between the highest position and the lowest position by considering the possible frictions between the components.

Furthermore, the first arm 21 and the second arm 22 of the energy storage element 2 may generate other kinds of forces against the first surface 11 and the second surface 12, these effects are also related to the change of the first included angle θ1, the second included angle θ2, and the fourth included angle θ4. In other words, the first effective resistance F1x and the second effective resistance F2x probably include the dividing force of the static friction or kinetic friction. However, the main effects were discussed in the aforementioned paragraphs, and other effects are not specified herein.

It should be noted that the original value of the first included angle θ1 is larger than an included angle between the first surface 11 and the second surface 12 at the highest position. Therefore, it should be understood that the third included angle θ3 between the first surface 11 and the first axis X and the fifth included angle θ5 between the second surface 12 and the first axis X are constantly smaller than the first angle θ1. Specifically, in the present embodiment, the first surface 11 and the second surface 12 are symmetrical with respect to the first axis X, and their inclined angles with respect to the first axis X equal to the third included angle θ3.

In order to ensure that the first arm 21 and the second arm 22 may effectively abut against the first surface 11 and the second surface 12 respectively, the first included angle θ1 should be larger than the included angle between the first surface 11 and the second surface 12. That is, θ1>θ3+θ5 must be fulfilled, thus the energy storage element 2 may continuously provide resistances against the first surface 11 and the second surface 12.

Also, the projected length of the first arm 21 and the second arm 2 projected on the first axis X continuously increase in the process of moving the energy storage element 2 from the highest position to the lowest position. Please refer to FIG. 5, the included angle between the first arm 21 and the first axis X equals the sum of the second included angle θ2 and the third included angle θ3. The sum thereof continuously decreases because the third included angle θ3 remains constant and the second included angle θ2 continuously decreases. The projected length d of the first arm 21 projected on the first axis X is the length of the first arm 21 multiply cos(θ2+θ3), wherein (θ2+θ3) is between 0 and 90 degrees. (θ2+θ3) gradually decreases and the projected length d gradually increases to the projected length d' when the energy storage element 2 moves from the highest position to the lowest position. Similarly, the projected length of the second arm 22 projected on the first axis X is the length of the second arm 22 multiply cos(θ4+θ5). (θ4+θ5) gradually decreases and the projected length gradually increases when the energy storage element 2 moves from the highest position to the lowest position.

Figure 6:
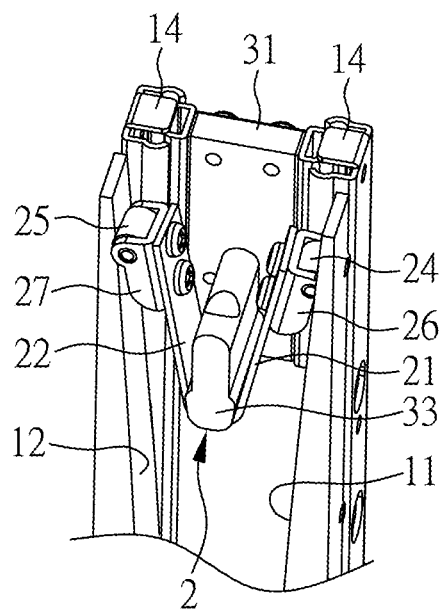
FIG. 6 is a rear view of a partial perspective view of the elevatable supporting device of the second embodiment of the present invention.
Figure 7:
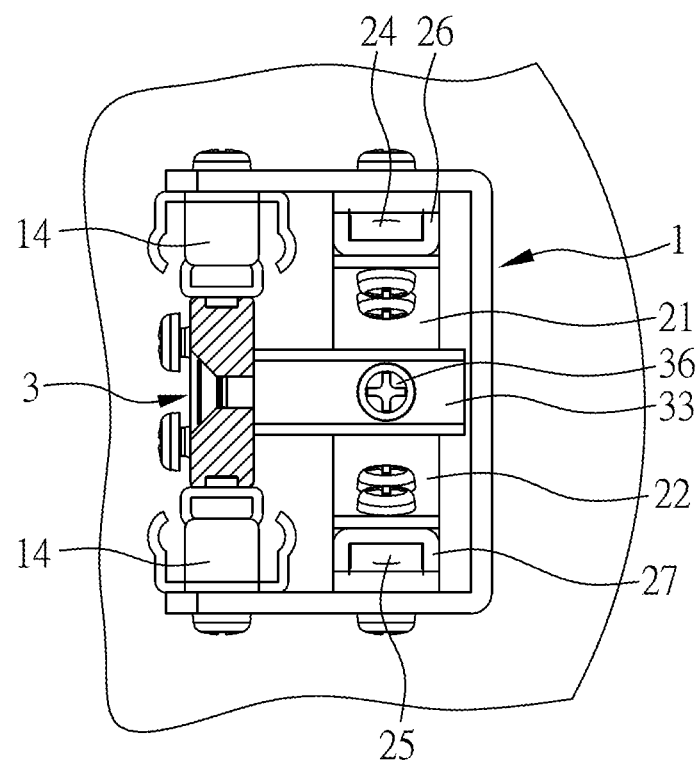
FIG. 7 is a top view of the elevatable supporting device of the second embodiment of the present invention.

Please refer to FIG. 6 and FIG. 7 illustrating the partial perspective view and the top view of the elevatable supporting device 1000 of the second embodiment of the present invention.

Figure 8:
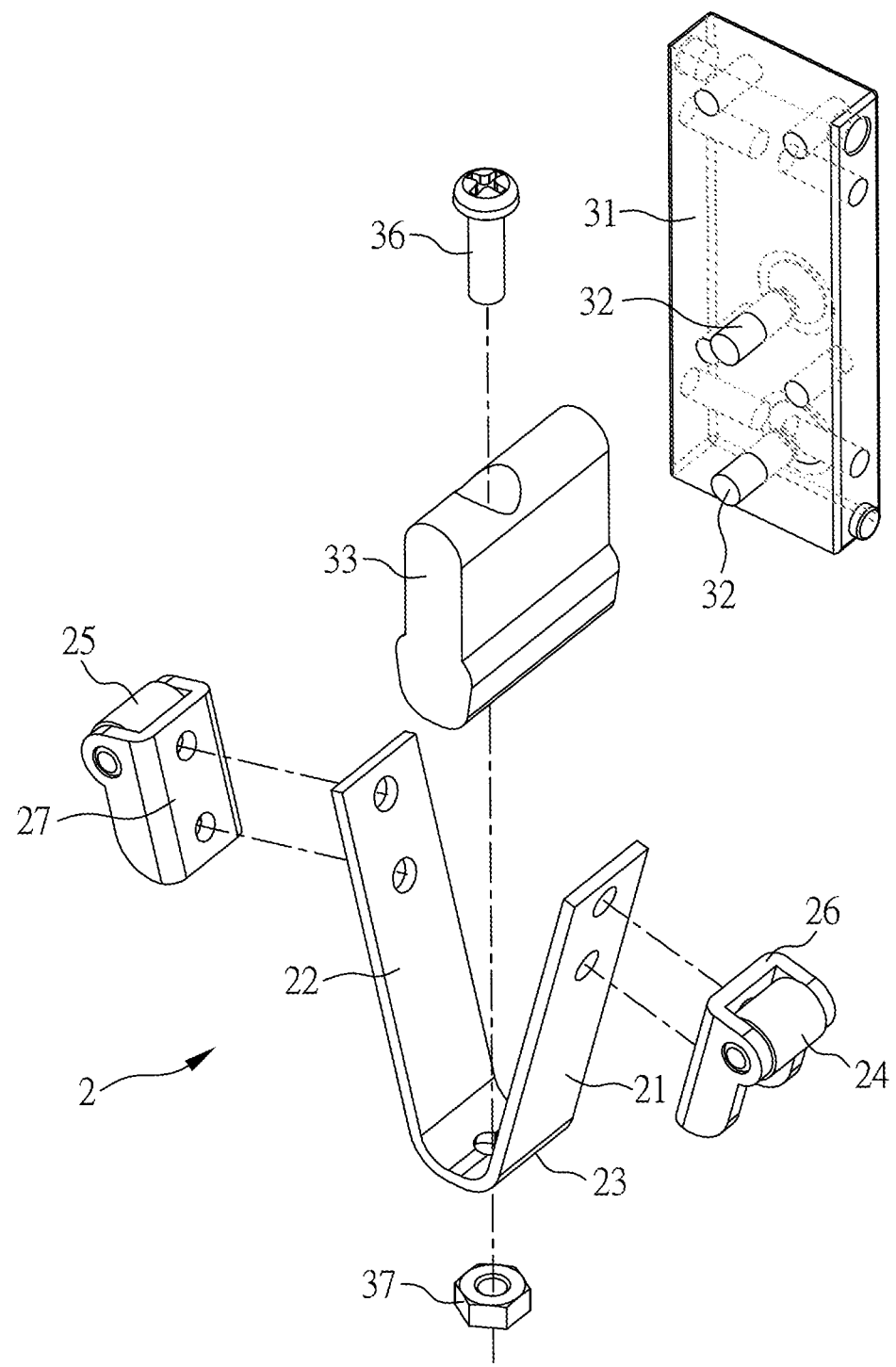
FIG. 8 is a partial explosive view of the elevatable supporting device of the second embodiment of the present invention.

The operation principle of the present embodiment is similar to that of the first embodiment, the difference between them is that the energy storage element 2 includes a V-shaped elastic steel plate. The V-shaped elastic steel plate is preferably made of a flat spring, wherein the connecting section 23 having a pre-opening angle is formed by bending the elastic plate. Different from the torsional spring utilized in the first embodiment, the connecting section 23 of the energy storage element 2 does not include a winding portion 231, so that the energy storage element 2 and the bearing module 3 are not actuated together through the winding portion 231 that set on the shaft 32. As illustrated in FIG. 8, the bearing module 3 of the present embodiment has two shafts 32, a block 33, a screw 36, and a nut 37. The block 33 connects to the shafts 32 and the connecting section 23 of the energy storage element 2. Specifically, the screw 36 passes through the block 33 and the connecting section 23 simultaneously and is bolted with the nut 37 to fasten the block 33 and the connecting section 23. The shafts 32 pass through and are fixed to the block 33; therefore, the energy storage element 2 and the bearing module 3 can be actuated simultaneously.

In addition to the present embodiment, the first arm 21 and the second arm 22 of the energy storage element 2 are plate-shaped because the first arm 21, the second arm 22, and the connecting section 23 are integrally formed by bending the elastic steel plate, such as the flat spring. Accordingly, the energy storage element 2 further comprises a first pivotal unit 26 disposed on the first arm 21 and a second pivotal unit 27 disposed on the second arm 22 for assembling the first follower 24 and the second follower 25, wherein the first follower 24 pivotally fixed to the first pivotal unit 26 and the second follower 25 pivotally fixed to the second pivotal unit 27.

Figure 9:
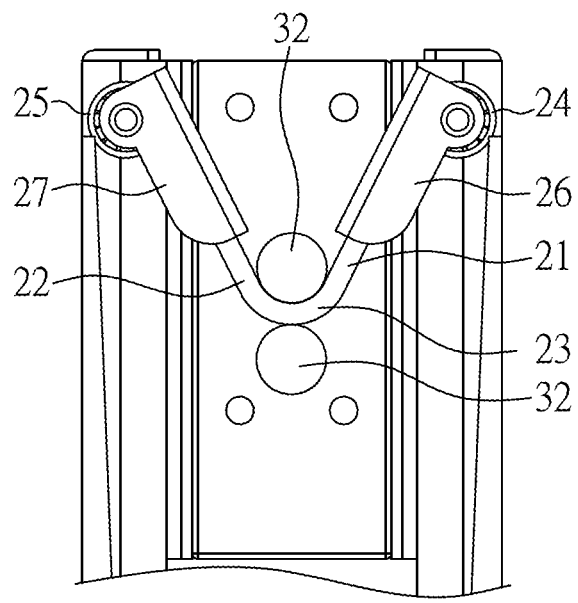
FIG. 9 is a rear view of a partial view of the elevatable supporting device of the third embodiment of the present invention.
Figure 10:
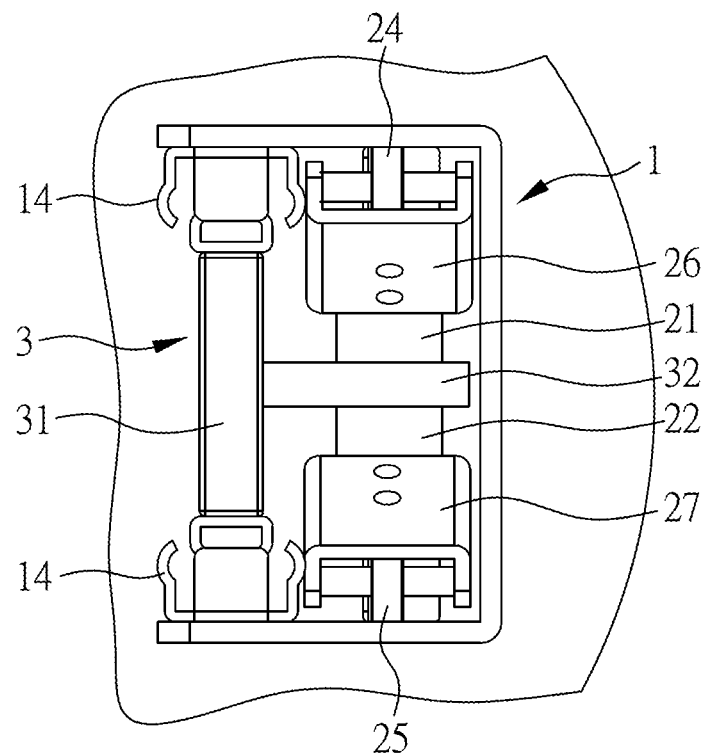
FIG. 10 is a top view of the elevatable supporting device of the third embodiment to the present invention.

Please refer to FIG. 9 and FIG. 10, which illustrate the rear partial perspective view and the top view of the elevatable supporting device 1000 of the third embodiment of the present invention.

The structural features are similar to that of the second embodiment, wherein the energy storage element 2 comprises a V-shaped elastic steel plate with a pre-opening angle, a first follower 24 and the second follower 25 are actuated together with the first arm 21 and the second arm 22 through the first pivotal unit 26 and the second pivotal unit 27 to which the first follower 24 and the second follower 25 are pivotally fixed. The difference between the present embodiment and the second embodiment is that the present embodiment does not comprise the block 33 in the second embodiment. The bearing module 3 is actuated together with the energy storage element 2 by directly clamping two sides of the connecting section 23 with the shaft 32.

Figure 11:
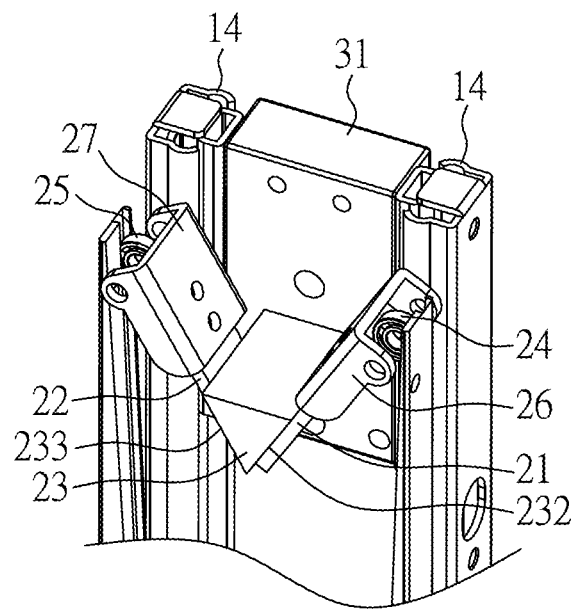
FIG. 11 is a rear view of a partial perspective view of the elevatable supporting device of the fourth embodiment of the present invention.
Figure 12:
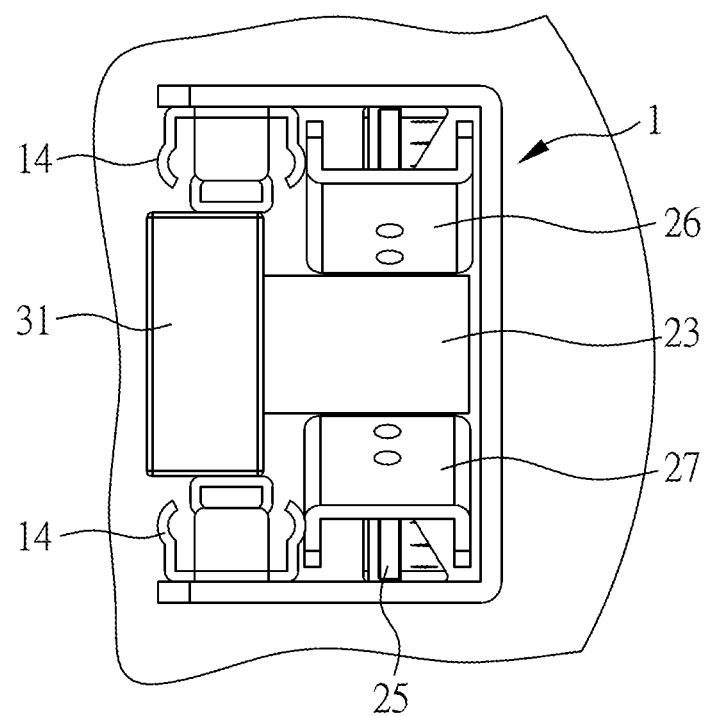
FIG. 12 is a top view of the elevatable supporting device of the fourth embodiment of the present invention.

Refer to FIG. 11 and FIG. 12, which illustrate the rear partial perspective view and the top view of the elevatable supporting device 1000 the fourth embodiment.

The operational principle of the present embodiment is similar to that of the abovementioned embodiments, and the structural features are similar to that of the second embodiment. The difference between the present embodiment and the abovementioned embodiment is that the energy storage element 2 includes two flat springs that fixed to the connecting section 23. The flat springs are the first arm 21 and the second arm 22 respectively, and the connecting section 23 is a support block connecting to the slider 31. The flat springs may be fixed to the connecting section 23 through welding or screw locking. The support block has a first inclined plane 232 and a second inclined plane 233, wherein a portion of the first arm 21 is fixed to the first inclined plane 232, and a portion of the second arm 22 is fixed to the second inclined plane 233. Similar to the aforementioned embodiments, the first follower 24 and second follower 25 pivotally fixed to the first pivotal unit 26 and the second pivotal unit 27 respectively and are actuated together with the first arm 21 and the second arm 22. In the present embodiment, the source of the total effective resistance Fx is the flat springs. The elevatable supporting device 1000 utilizes parts of the first arm 21 and the second arm 22 other than the parts connecting to the connecting section 23 (support block) as the deformable segments of the flat springs for providing support against the weight of the energy storage element 2, the bearing module 3, and the display 2000.

In addition to the present embodiment, the bearing module 3 does not include the shaft 32 and the block 33; therefore, the energy storage element 2 is directly connected to and actuated together with the bearing module 3 through the connecting section 23 (support block). The connecting section 23 is connected to the first arm 21 and the second arm 22, and is fixed to the slider 31 so that the energy storage element 2 and the bearing module 3 can be actuated together. Also, in the present embodiment, the first follower 24 and the second follower 25 are bearings.

Figure 13:
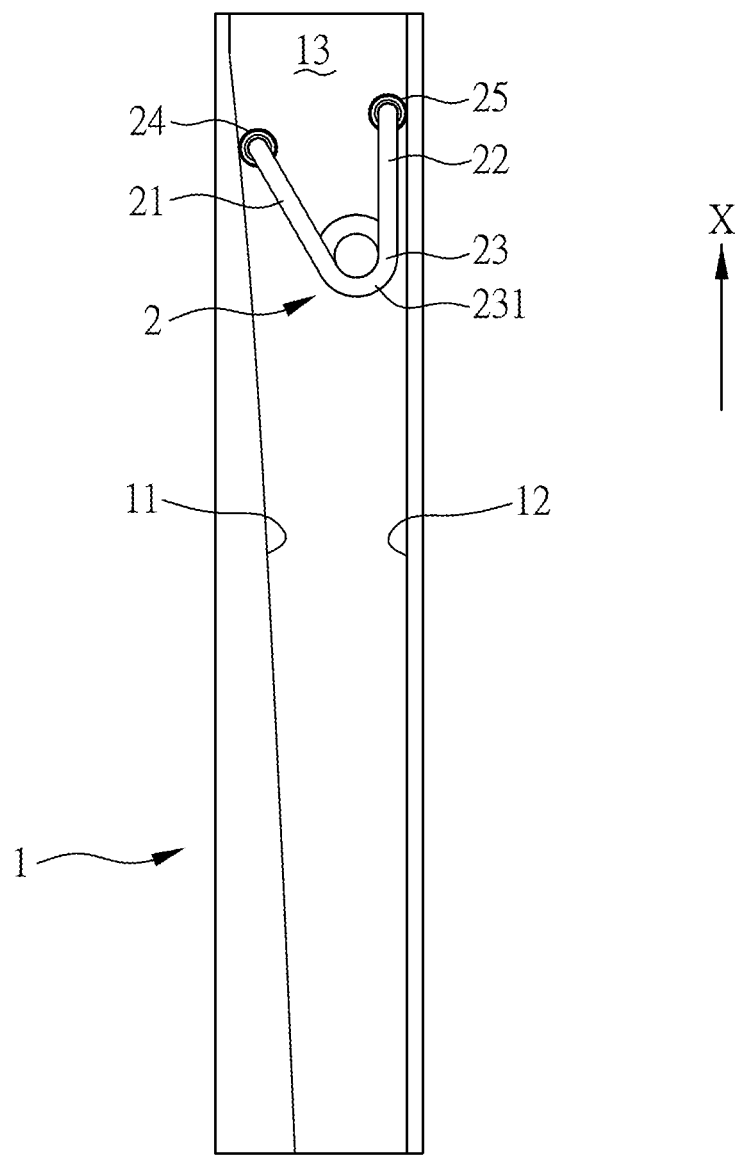
FIG. 13 is a partial view of the elevatable supporting device of the fifth embodiment of the present invention.

Please refer to FIG. 13, illustrating the partial view of the elevatable supporting device 1000 of the fifth embodiment of the present invention.

The structural features are similar to that of the first embodiment. The difference between them is that the first surface 11 and the second surface 12 of the present embodiment are non-symmetrical with respect to the first axis X, and the concave portions 111, 121 are omitted. For instance, the first surface 11 and the second surface 12 are non-parallel but the second surface 12 is parallel to the first axis X. When the energy storage element 2 moves between the highest position and the lowest position, the second arm 22 slides close to the second surface 12 and simultaneously moves with the bearing module 3 and the display 2000 along the first axis X.

In the present embodiment, only the first surface 11 inclined with respect to the first axis X, therefore, the first included angle $\theta 1$ should only be maintained larger than the third included angle $\theta 3$ in the condition of $\theta 1 > \theta 3 + \theta 5$. Thus, the first arm 21 and the second arm 22 are able to effectively abut against the first surface 11 and the second surface 12.

Figure 14:
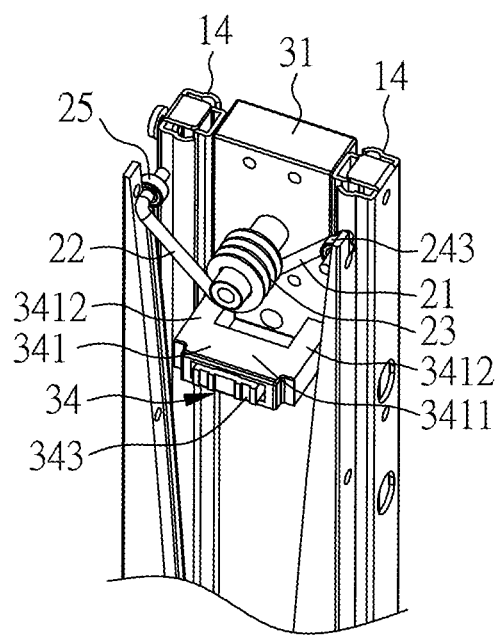
FIG. 14 is a rear view of a partial perspective view of the elevatable supporting device of the sixth embodiment of the present invention.
Figure 15:
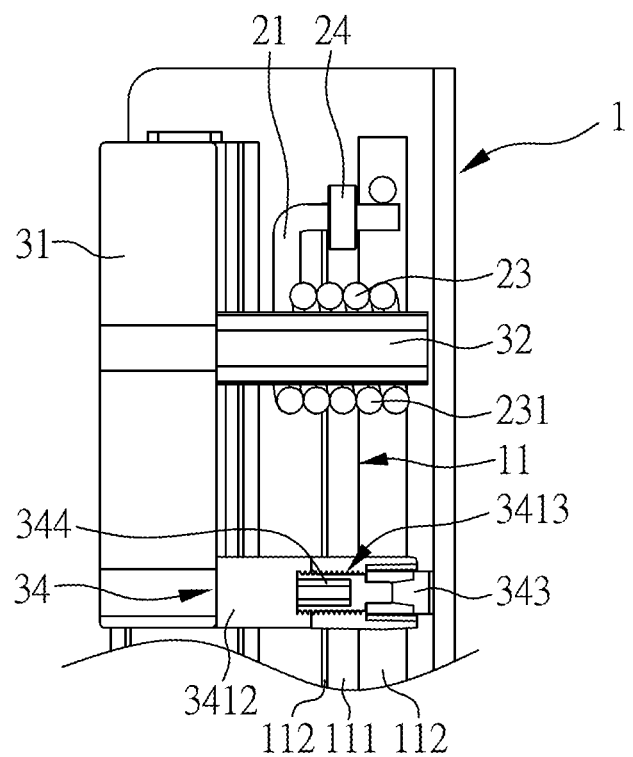
FIG. 15 is a side view of the elevatable supporting device of the sixth embodiment of the present invention.

Refer to FIG. 14 and FIG. 15 illustrating the rear partial perspective view and the cross-sectional view of the elevatable supporting device 1000 of the sixth embodiment of the present invention.

The structural features of the present embodiment are similar to that of the first embodiment; however, the bearing module 3 further includes a frictional unit 34 for providing extra frictional force to stabilize the slider 31 when sliding between the highest position and the lowest position. In other words, the frictional unit 34 is disposed adjacent to the upright 1 and has a main body 341, a friction block 343 and a screw 344. The main body 341 is U-shaped and has a middle segment 3411, two side arms 3412 connected to the middle segment 3411, and a through-hole 3413 passing through the middle segment 3411. The friction block 343 is disposed at the middle segment 3411, and the screw 344 is adjustably bolted to the through-hole 3413. Wherein the screw 344 passes through the through-hole 3413 and abuts against the friction block 343 so that the friction block 343 is tightly attached to the upright 1 and provides a normal force to the upright 1. When the bearing module 3 moves, a kinetic frictional force is generated between the friction block 343 and the upright 1, and when the bearing module 3 stops, a static frictional force is generated between the friction block 343 and the upright 1. Accordingly, the bearing module 3 and the energy storage element 2 become more stable when sliding between the highest position and the lowest position or stop at any position between the highest position and the lowest position. The users are able to adjust the screw 344 by screwing the screw 344 in or out for changing the normal force against the friction block 343, thus the maximum static frictional force between the static friction block 343 and the upright 1 and the maximum kinetic frictional force between the sliding friction block 343 and the upright 1 may be changed.

The friction block 343 of the present embodiment may be considered as an auxiliary structure added to the elevatable supporting device of the first embodiment. The functions of the energy storage element 2 are not affected by the friction block 343, but the stability of the elevatable supporting device 1000, the tolerance of stopping the display 2000 at any height, and the user's touch may be improved. The addition of the friction block 343 is not limited to the elevatable supporting device 1000 of the first embodiment, the friction block 343 abutting the upright 1 may be added to the bearing module 3 of the elevatable supporting devices 1000 of other embodiments.

Figure 16:
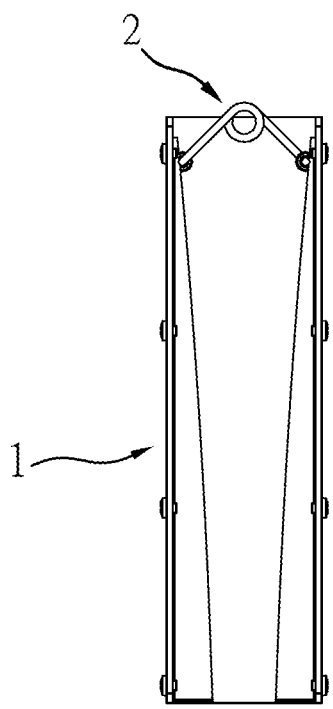
FIG. 16 is a partial view of the elevatable supporting device of the seventh embodiment of the present invention.
Figure 17:
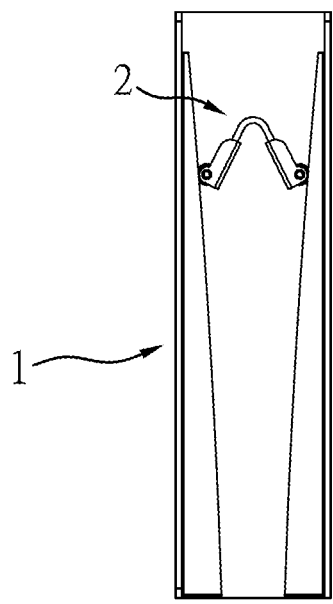
FIG. 17 is a partial view of the elevatable supporting device of the eighth embodiment of the present invention.
Figure 18:
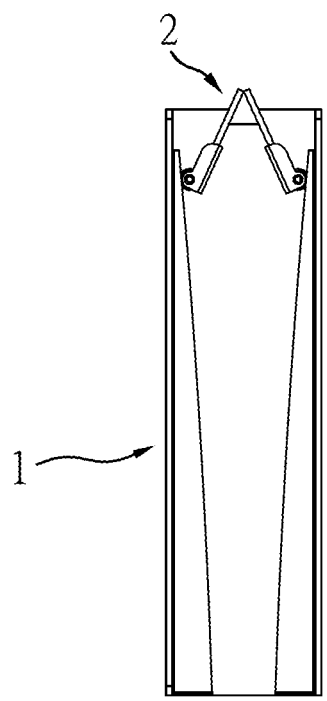
FIG. 18 is a partial view of the elevatable supporting device of the ninth embodiment of the present invention.
Figure 19:
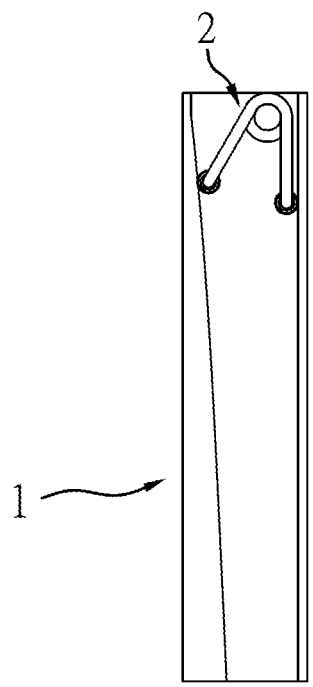
FIG. 19 is a partial view of the elevatable supporting device of the tenth embodiment of the present invention.

FIG. 16 to FIG. 19 illustrate the seventh embodiment to the tenth embodiment of the present invention, which comprise an upside-down energy storage element 2 (the opening of the first included angle θ1 faces downwardly). FIG. 16 shows that the torsional spring of the energy storage element 2 of the first embodiment is disposed upside-down at the highest position in the seventh embodiment. It is clear that the energy storage element 2 is compressed by the first surface 11 and the second surface 12 to provide the total effective resistance Fx when the energy storage element 2 slides downwardly. In comparison to the first embodiment, the only difference is that the placement direction of the energy storage element 2, the operational principle and other details remain the same. The eighth embodiment illustrated in FIG. 17 shows that the V-shaped elastic steel plate of the energy storage element 2 of the second and the third embodiment is disposed upside-down. The ninth embodiment illustrated in FIG. 18 shows that the flat springs and the connecting section 23 of the energy storage element 2 of the fourth embodiment is disposed upside-down. The tenth embodiment illustrated in FIG. 19 shows that the torsional spring of the energy storage element 2 of the fifth embodiment is disposed upside-down.

The operation principle of the upside-down energy storage element 2 is similar to the original energy storage element 2. When the energy storage element 2 moves from the highest position to the lowest position, the first included angle θ1 between the first arm 21 and the second arm 22 continuously decreases so that at least one of the first resistance F1 and the second resistance F2 may continuously increase and at least one of the second included angle θ2 and the fourth included angle θ4 may continuously decrease in order to maintain the total effective resistance Fx. When the energy storage element 2 moves from the lowest position to the highest position, the first included angle θ1 continuously increases so that at least one of the first resistance F1 and the second resistance F2 continuously decreases and at least one of the second included angle θ2 and the fourth included angle θ4 continuously increases in order to maintain the total effective resistance Fx.

In summary, according to the elevatable supporting device of the present invention, the change of the included angle between the arms of the energy storage element and the two surfaces makes the dividing forces of the first resistance and the second resistance generated from the highest position to the lowest position become almost the same. Hence, a constant supporting force along the first axis to support the bearing module and the display may be provided so that the display may stop at any position between the highest position and the lowest position. In comparison to the prior art, the energy storage element utilized in the elevatable supporting device in the present invention is advantageous of lower accuracy requirement of components, simple operational principle, stable, and long-life energy storage element.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An elevatable supporting device for bearing a display, the elevatable supporting device comprising:
    an upright extending along a first axis and including an accommodating space, a first surface, and a second surface non-parallel to the first surface, wherein the accommodating space is formed between the first surface and the second surface, and a highest position and a lowest position are defined on the first axis;
    an energy storage element being movably disposed in the accommodating space and abutting against the first surface and the second surface, wherein the energy storage element is a V-shaped elastic steel plate which is integrally formed and includes a connecting section, a first arm extending from the connecting section and providing a first resistance, and a second arm extending from the connecting section and providing a second resistance; and
    a bearing module connecting to the display and the energy storage element and sliding along the first axis with respect to the upright;
    wherein a first included angle is defined between the first arm and the second arm, a second included angle is defined between the first arm and the first surface, a third included angle, which is constant and smaller than the first included angle, is defined between the first surface and the first axis, a fourth included angle is defined between the second arm and the second surface, and a fifth included angle, which is constant and smaller than the first included angle, is defined between the second surface and the first axis; and
    wherein when the energy storage element moves from the highest position to the lowest position, the first included angle between the first arm and the second arm of the energy storage element continuously decreases so that at least one of the first resistance and the second resistance continuously increases and at least one of the second included angle and the fourth included angle continuously decreases, conversely, when the energy storage element moves from the lowest position to the highest position, the first included angle between the first arm and the second arm of the energy storage element continuously increases so that at least one of the first resistance and the second resistance continuously decreases and at least one of the second included angle and the fourth included angle continuously increases; thereby, a total effective resistance on the first axis is substantially constant, and when an external force is applied, the energy storage element, the bearing module, and the display move simultaneously, whereas when the external force is removed, the energy storage element, the bearing module, and the display are in a static equilibrium status so that the display is able to stop at any position between the highest position and the lowest position.

2. The elevatable supporting device as claimed in claim 1, wherein an interval on a second axis perpendicular to the first axis is defined between the first surface and the second surface, wherein a width of the interval continuously decreases from the highest position to the lowest position.

3. The elevatable supporting device as claimed in claim 2, wherein a projected length of the first arm projected on the first axis continuously increases from the highest position to the lowest position.

4. The elevatable supporting device as claimed in claim 3, wherein the first resistance forms a first effective resistance on the first axis and the second resistance forms a second effective resistance on the first axis, wherein the total effective resistance is a sum of the first effective resistance and the second effective resistance.

5. The elevatable supporting device as claimed in claim 4, wherein the energy storage element has a first follower disposed on the first arm and a second follower disposed on the second arm, wherein the first follower contact with the first surface and the second follower contact with the second surface.

6. The elevatable supporting device as claimed in claim 5, wherein the upright has a sliding module disposed along the first axis, and the bearing module connects to the sliding module to slide with respect to the upright so that the first arm slides along the first surface and the second arm slides along the second surface.

7. The elevatable supporting device as claimed in claim 6, wherein the bearing module connects to the connecting section.

8. The elevatable supporting device as claimed in claim 7, wherein the first surface and the second surface are symmetrical with each other with respect to the first axis.

9. The elevatable supporting device as claimed in claim 7, wherein the first surface and the second surface are non-symmetrical with each other with respect to the first axis in which the second surface is parallel to the first axis.

10. The elevatable supporting device as claimed in claim 7, wherein the bearing module has two shafts disposed on opposite sides of the connecting section to clamp the connecting section.

11. The elevatable supporting device as claimed in claim 7, wherein the bearing module has at least one shaft and a block, and wherein the at least one shaft and the connecting section are secured to the block.

12. The elevatable supporting device as claimed in claim 11, wherein the bearing module further has a thread and a nut for securing the connecting section to the block, and wherein the at least one shaft passes through and is secured to the block.

13. The elevatable supporting device as claimed in claim 1, wherein the bearing module further comprises a friction unit disposed adjacent to the upright for providing a normal force towards the upright, and a kinetic friction force is generated between the friction unit and the upright when the bearing module moves with respect to the upright.

14. The elevatable supporting device as claimed in claim 13, wherein the friction unit has a friction element and a screw abutting against the friction element towards the upright so that the normal force is able to be adjusted according to an extent of the screw abutting against the friction element.

* * * * *